Patented Aug. 14, 1945

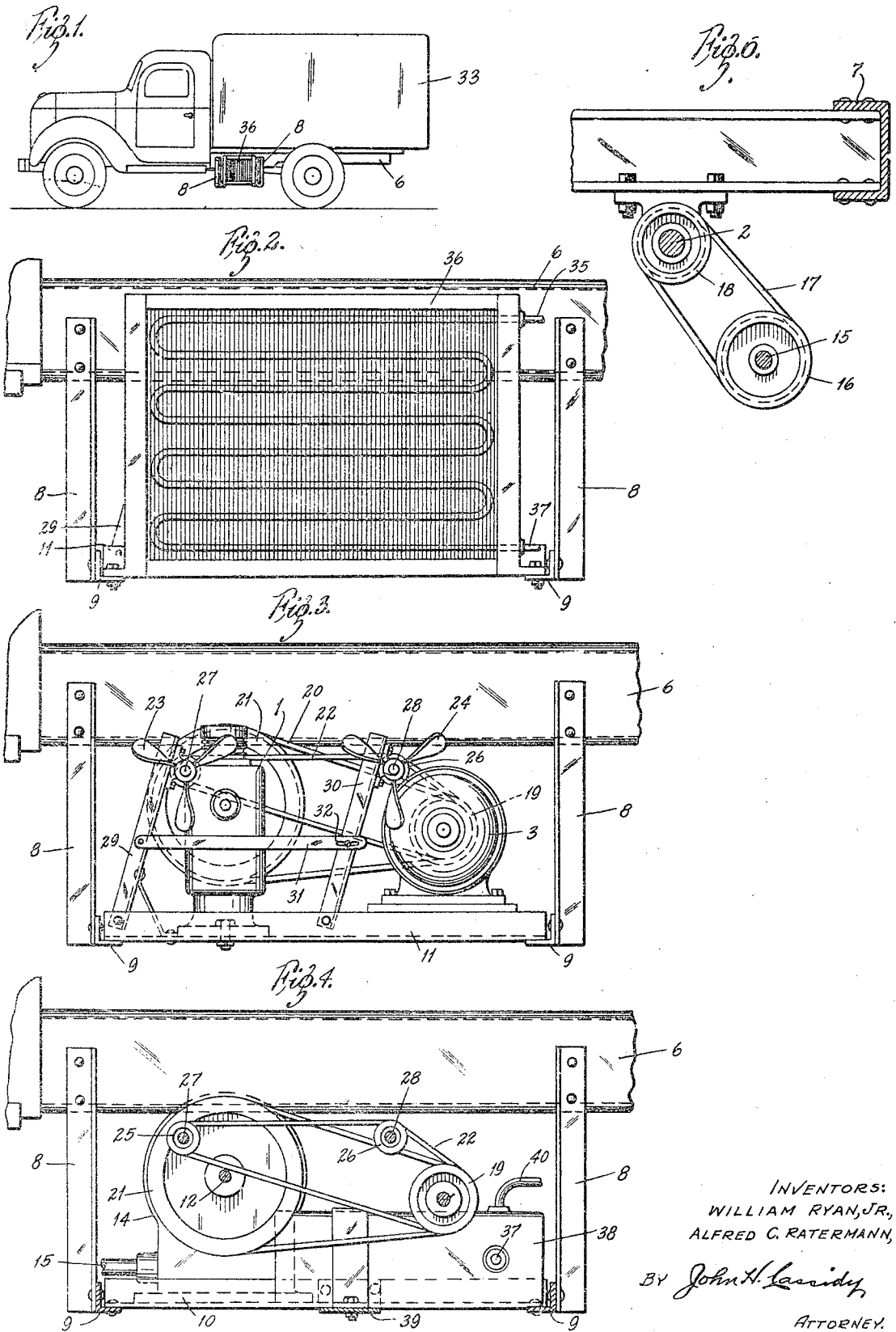

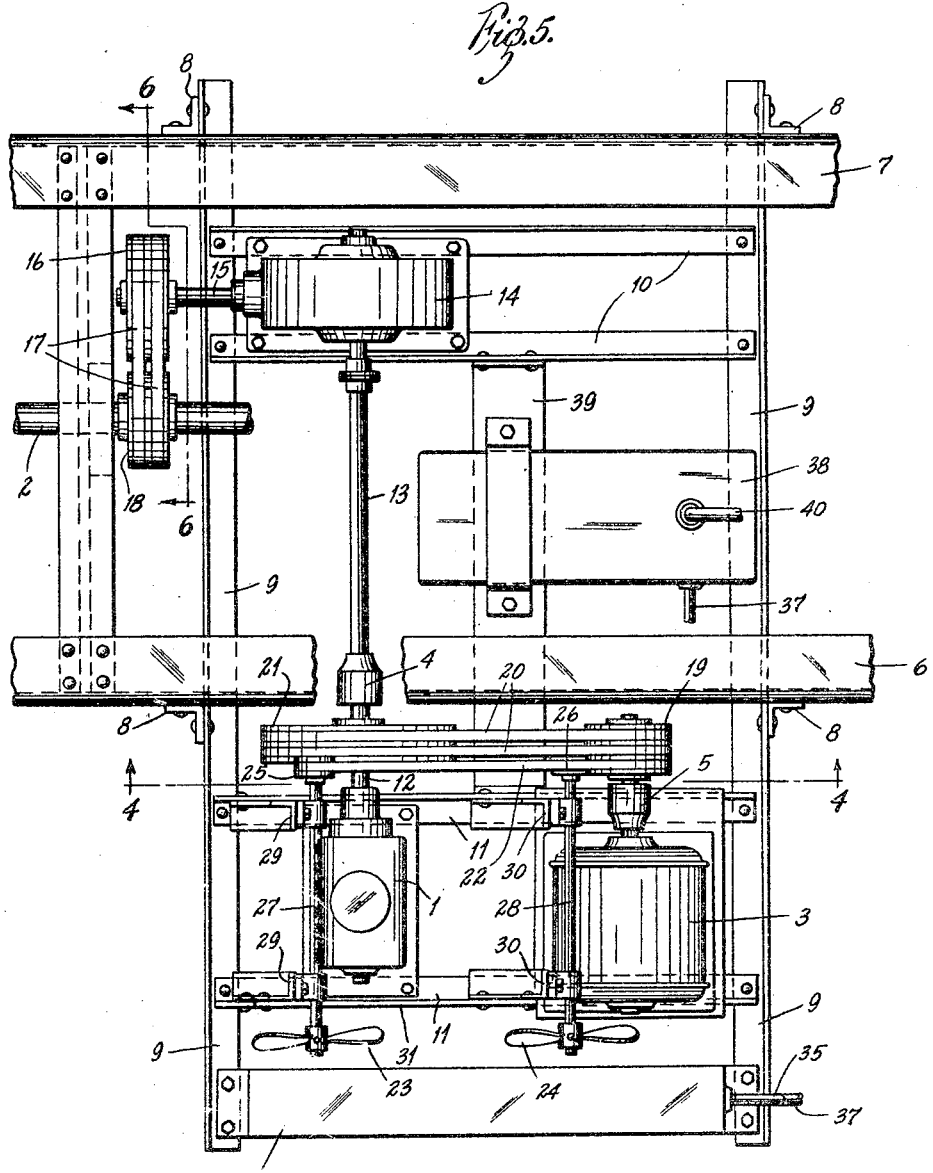

2,382,667

UNITED STATES PATENT OFFICE 2,382,667

REFRIGERATING SYSTEM FOR MOTOR VEHICLES

William Ryan, Jr., University City, and Alfred C. Ratermann, St. Louis, Mo.; said Ratermann assignor to said Ryan, Jr.

Application April 26, 1943, Serial No. 484,556

3 Claims. (Cl. 62—117)

This invention relates to a refrigerating system for motor vehicles, particularly of the type which may be driven by the vehicle.

An object of the invention is to provide an efficient system of driving the compressor of a refrigerating system on a vehicle from a driven shaft of the vehicle.

Another object of the invention is to provide means whereby the compressor may also be driven from an electric motor without manipulating or changing the driving connections between the compressor and the driven shaft, and between the compressor and the motor.

Other advantages will be apparent from the following detail description, taken in connection with the accompanying drawings.

Fig. 1 shows a motor truck having the refrigerating system installed thereon;

Fig. 2 is a side elevation looking toward the condenser;

Fig. 3 is a view similar to Fig. 2, but with the condenser removed;

Fig. 4 is a vertical section on line 4—4, of Fig. 5;

Fig. 5 is a plan view showing the refrigerating system;

Fig. 6 is a detail showing a part of the power connection between the driven shaft and a speed reducer; and Fig. 7 is a diagram showing the system.

A compressor 1 is driven by a driven shaft 2 of the motor vehicle, or by an electric motor 3. The arrangement is such that the compressor may be driven by either of the two devices without interfering with the driving connections. This is accomplished by interposing a unidirectional clutch 4 in the driving connection between the shaft 2 and the compressor, and a unidirectional clutch 5 in the connection between the motor and the compressor. That is to say, when the vehicle is running in a forward direction, the shaft 2 will drive the compressor 1 through the unidirectional clutch 4, while the clutch 5 will permit the device to turn freely without revolving the rotor of the motor. On the other hand, when the vehicle is standing, the motor 3 may be connected to any convenient power line and will drive the compressor through the clutch 5, while the clutch 4 will permit the compressor to run without producing any torque on the driven shaft 2 of the motor vehicle.

The driven shaft 2, in the arrangement as specifically shown on the drawings, is the propeller shaft of the vehicle.

The compressor, motor and condenser, and other devices are supported by a framework suspended from the frame members 6 and 7 of the vehicle. This framework includes vertical members 8 extending below the vehicle frame members or sills 6 and 7, cross members 9, and longitudinal members 10 and 11.

The compressor 1 has its base bolted to the longitudinal members 11. It has a main driving shaft 12 extended inwardly and concentric with a shaft 13 connected to a speed reducer 14, the clutch 4 being connected between the shaft 12 and the shaft 13. The speed reducer 14, which may be a gear reduction device of commercial design, has its base bolted to the longitudinal members 10, and has a driving shaft 15 on which is a sheave 16. The sheave 16 is connected by belts 17 to a sheave 18 on the propeller shaft 2. It is through the power transmission means just described that the compressor 1 is driven by the propeller shaft 2 of the motor vehicle.

The motor 3 has its shaft connected through the unidirectional clutch 5 to a sheave 19. The sheave 19 is connected by belts 20 to a sheave 21 on the compressor shaft 12. The sheave 19 has a groove to accommodate a belt 22 for driving fans 23 and 24 through their pulleys 25 and 26 respectively.

The fan 23 is secured to the front end of a shaft 27, which carries the pulley 25 on its rear end, while the fan 24 is secured to a shaft 28 which is connected to and driven by the pulley 26. The shaft 27 is journalled in bearing on a pair of uprights 29 rigidly secured to the longitudinal members 11, while the shaft 28 is journalled in bearings carried by a pair of uprights 30 pivoted to the frame members 11, and held in adjusted position by a strap 31. The strap 31 has a slot 32 to accommodate a bolt passing through an upright 30, whereby the position of the shaft 28 can be adjusted for tightening the belt 22.

In the construction as specifically illustrated, the body 33 is to be refrigerated. A gas line 34 leads from an evaporator in the body, not shown, to the compressor 1. Compressed gases pass from the compressor through a line 35 to a condenser 36, which is cooled by the fans 23 and 24. The condenser 36 is bolted to the cross member 9. A line 37 runs from the condenser to a storage tank 38 which is supported by a cross member 39, in turn secured to longitudinal members 10 and 11. A line 40 leads from the storage tank to the evaporator in the body 33.

A speed reducer 14 is selected which will give the most efficient speed for the compressor 1, when the vehicle is running at its normal rate of speed; for instance 40 miles per hour. It has been found entirely practicable to operate this refrigerating system without thermostatic controls, but such thermostatic controls for the system may be used if conditions require them. It will be apparent, of course, that when operated solely through the operation of the vehicle, the refrigerating system will not be operating while the vehicle is standing still. In order to precool the truck body, prior to loading, or to maintain the contents cool while the truck is idle for several hours, there is provided the electric motor 3, which may be connected to any convenient source of power.

It will be apparent from the foregoing description that the compressor and the fans may be operated independently, either by the vehicle or by the electric motor, without changing the mechanical driving connections. This is permitted by the unidirectional clutches 4 and 5. In other words, when the compressor 1 is being driven by the propeller shaft of the vehicle, the clutch 5 will permit the sheave 19 to overrun the shaft of the motor, and when the compressor is being driven by the motor the clutch 4 will permit the shaft 13 to be overrun.

It is to be noted that the axis of the shaft of the compressor and the driven shaft of the speed reducer 14 are crosswise of the vehicle, or normal to the propeller shaft of the vehicle. This minimizes vibration. It will also be noted that the speed reducer 14 is mounted to one side of the propeller shaft, while the compressor is mounted on the opposite side of the propeller shaft. This gives a balancing effect and also minimizes vibration.

It will be obvious that various changes may be made in the details of construction, within the scope of the appended claims, without departing from the spirit of this invention. Parts of the invention may be used without the whole, and various improvements may be made while retaining the advantages of this invention.

We claim:

1. In a refrigerating system for a motor driven vehicle having a frame and a propeller shaft longitudinally of the frame, the combination comprising a supporting frame suspended below the vehicle frame, a speed reducer mounted in the supporting frame to one side of the propeller shaft, a compressor mounted in the frame on the opposite side of said shaft, the speed reducer and compressor being mounted and arranged so that a driven shaft of the reducer is coaxial with and connected to a driving shaft of the compressor, said axis being crosswise of the vehicle, and a belt driven by the propeller shaft and driving the speed reducer.

2. In a refrigerating system for a motor driven vehicle having a frame and a propeller shaft extending longitudinally of the frame, the combination comprising a supporting frame suspended below the vehicle frame, a compressor mounted in the supporting frame at one side of the propeller shaft, a condenser mounted outwardly from the compressor and substantially parallel to the first mentioned frame, a fan mounted between the compressor and the condenser, the compressor and fan having shafts normal to the propeller shaft, and power transmission means between the propeller shaft and the shafts of the compressor and fan.

3. In a refrigerating system for a motor driven vehicle having a supporting frame suspended below the vehicle frame, a driven shaft extending longitudinally of the frame, the combination comprising a compressor mounted on the supporting frame at one side of the driven shaft, an electric motor supported on the frame, power transmitting means connecting the compressor and said driven shaft, a second power transmitting means connecting the compressor and the motor, each of said power transmitting means including a unidirectional clutch so arranged that the compressor may be driven selectively by the said driven shaft or by the motor without changing or disconnecting either of said means, and means for connecting the electric motor to a circuit external of the vehicle whereby the refrigerating system is made operative automatically when the vehicle is stationary by connecting the electric motor to said external circuit.

WILLIAM RYAN, Jr.
ALFRED C. RATERMANN.